United States Patent [19]
Lehoczky

[11] Patent Number: 6,104,097
[45] Date of Patent: Aug. 15, 2000

[54] UNDERWATER HYDRO-TURBINE FOR HYDROGEN PRODUCTION

[76] Inventor: Kalman N. Lehoczky, 6156 9th Ave. Cir. NE., Bradenton, Fla. 34202

[21] Appl. No.: 09/262,450

[22] Filed: Mar. 4, 1999

[51] Int. Cl.[7] .................................................... F03B 13/10
[52] U.S. Cl. ................................. 290/54; 290/43; 60/506
[58] Field of Search ......................... 290/54, 43; 60/506; 415/3.1, 4.1; 168/1, 2; 122/1, 2

[56] References Cited

U.S. PATENT DOCUMENTS

| | | | |
|---|---|---|---|
| 4,026,587 | 5/1977 | Hultman et al. ............................ | 290/53 |
| 4,163,904 | 8/1979 | Skendrovic ................................ | 290/54 |
| 4,613,279 | 9/1986 | Corren et al. ............................. | 415/2 A |
| 4,868,408 | 9/1989 | Hesh .......................................... | 290/52 |
| 5,100,290 | 3/1992 | Berger ........................................ | 415/60 |
| 5,798,572 | 8/1998 | Lehoczky .................................. | 290/54 |

*Primary Examiner*—Nicholas Ponomarenko

[57] ABSTRACT

Hydro-turbine driven electrical generating unit, contained in a water tight bulb housing and submerged in a water current, is comprised of a combination of turbine runner, turbine shaft, turbine shaft seal, bearings, speed-increasing transmission, generator, and couplings, and a central terminal block for the connection of power, measuring and control cables and tubes. The electric energy generating unit is an alternating current generator which supplies the alternating current to an electric converter which transforms the the alternating current into direct current and the direct current is used in an electrolyze device producing Hydrogen and Oxygen.

9 Claims, 1 Drawing Sheet

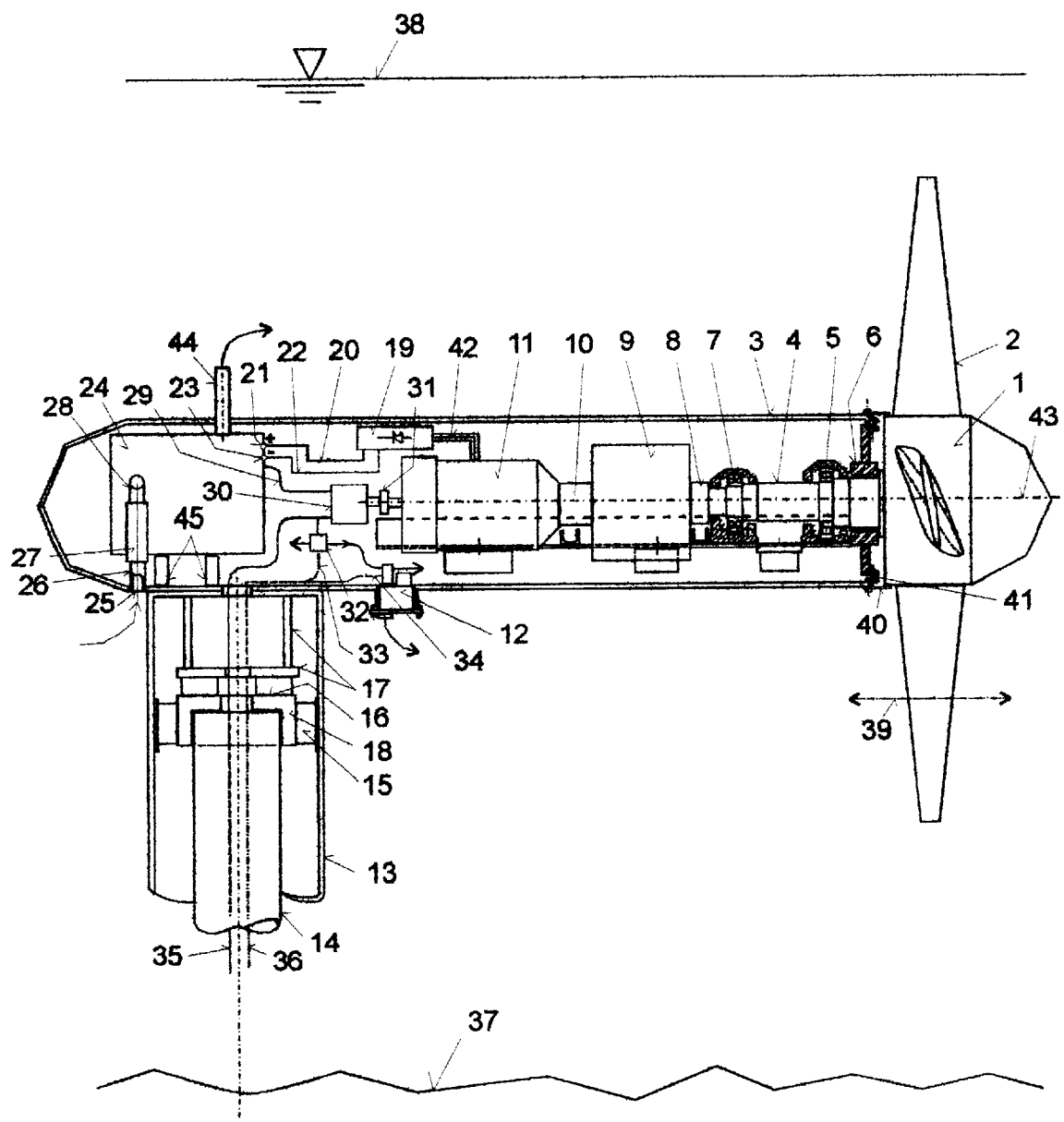

UNDERWATER HYDRO-TURBINE FOR HYDROGEN PRODUCTION

BACKGROUND OF THE INVENTION

1. Field of the Invention

The present invention relates to hydro-turbine units submerged in rivers, ocean currents and especially those which convert the kinetic energy of the water current into electrical energy. Typically, these units consist of a bulb housing and a rotating system consisting of turbine runner, turbine shaft, turbine shaft seal, bearings, speed increasing transmission, electrical generator and shaft couplings. The additional auxiliary equipment provides for removal of leakage water, measurement and control actions.

2. Description of the Prior Art

The problem with this type of equipment is how to utilize efficiently the variable speed of the water current for production of electrical energy on a constant voltage and frequency level, typically 50 or 60 Hz.

Usually, the problem is solved by using a turbine controller which ensures a constant rotational speed of the generator independently from the changing velocity of the water current and the actual electrical load. A turbine controller causes a significant complication and price increase.

Another method accepts that the generator's rotational speed, electrical frequency and voltage varies following the water current's velocity changes but through application of an electrical frequency and voltage converter transforms the generated variable frequency and voltage into a constant electrical frequency and voltage. The requirement on a constant voltage and frequency is based on the assumption that all energy will be transported and used as 50 or 60 Hz power.

The cost of a frequency and voltage converter is significant.

SUMMARY OF THE INVENTION

The invention relates to a hydro-turbine driven electrical generating unit, contained in a water tight bulb housing and submerged in a water current, comprised of a combination of turbine runner, turbine shaft, turbine shaft seal, bearings, speed-increasing transmission, generator, and couplings, and a central terminal block for the connection of power, measuring and control cables and tubes. The electrical energy generating unit is an alternating current generator which supplies the alternating current to an electric converter which transforms the alternating current into direct current and the direct current is used in electrolyze device to separate the water into Hydrogen (H2) and Oxygen (O2). In accordance with the present invention there is no need for a turbine controller to stabilize the rotational speed of the generator and also an expensive electric energy-converter producing a constant electrical frequency and voltage can be omitted. The final product is not the electrical energy but Hydrogen (H2) which can be used in apparatus and engines designed for combustion of Hydrogen (H2).

BRIEF DESCRIPTION OF THE DRAWINGS

In accordance with this invention the electrolyze device using direct current (DC) can be built into or directly connected to the under-water turbine unit or can be installed above the level of the water current for example on the dry land. In the application example shown in the enclosed drawing the electrolyze device is inside of the turbine unit.

FIG. 1 shows the longitudinal cross section of hydro-turbine unit in accordance with the invention. The turbine runner, consisting of hub 1 and blades 2, is arranged at the end of the bulb housing 3. The bulb housing is a large diameter steel tube. The turbine shaft 4 enters into the housing through a shaft seal 6. The shaft seal is installed in a plate perpendicular to the shaft which plate at the outer periphery is connected to the housing 3 by a flexible sealing 41. A thin cover plate 40 is mounted on the housing covering the gap between the turbine hub 1 and the housing. There is a narrow radial gap between the stationary cover plate 40 and the rotating hub 1. The purpose of the plate 40 is to prevent that larger objects approaches the shaft 4.

The turbine shaft 4 is supported in two bearings 5 and 7. Bearing 7 is designed both for radial and axial shaft forces. The turbine shaft 4 and the low-speed shaft of the speed-increasing gear 9 is connected by a shaft coupling 8. The outgoing high speed shaft of the speed increaser and the shaft of the generator 11 is connected by a shaft coupling 10.

The generator in this case assumed to be a synchronous generator. In order to make the generator maintenance-free a so-called brushless design is chosen. A brushless design means that the rotor contains permanent magnets or the rotor is equipped with field windings which get a direct current supply from the rotor of an excitation machine which is installed on common shaft with the generator rotor. In this case the current from the excitation machine can go directly to the synchronous generator's rotor coils without passing through a brush - slepering system. This latter arrangement usually contains diodes installed in the rotating system converting the excitation machine's alternating current into direct current. The direct current is fed into the synchronous generator's rotor coils.

The generator stator supplies an alternating current (AC), in this case a three-phase current through the main leads 42. This current may have a changing voltage level and frequency dependent on the rotational speed of the generator and turbine shaft. The voltage may be stabilized by an automatic which controls the excitation machine's stator current supply. Of course this is not the case at a permanent magnet excited generator rotor.

The alternating current (AC) enters a converter 19 based on stationary, for example solid state diodes, transistors and/or thyristors. The electrical output from the converter is a direct current (DC) leaving the converter through the 4% positive, +, 20 and negative, −, leads 22. Phase numbers higher than three may be beneficial for the electrical system and the quality of the produced direct current. The converter makes it sure that the polarity of the direct current never changes and independent from the turbine's rotational speed and direction. The converter has his own programmed electronic control automatic but this control can be overridden by manual intervention from the land. The control automatic influences among other the DC voltage dependent on the available generator voltage and frequency as well as the electrochemical conditions in the connected electrolyze device.

The direct current is introduced into an electrolyze device. A typical electrolyze device consists of positive and negative electrodes called anodes and cathodes which is connected to the positive, +, and negative, −, poles of the direct current power source. The electrical energy is used to split the water, H2O, into Oxygen, O2, and Hydrogen, H2. The electrolysis cannot work if the water is a so-called distilled water since the distillated water has no electrical conductivity. Water found in the nature has usually a certain amount of conductivity. For example, the sea water is conductive due to the dissolved salt, NaCl, and other chemical components. Exposing the sea water to electrolysis Oxygen and Chlorine will be produced at the anode. The cathode will be the Hydrogen producing electrode in addition to a small amount of metallic ions. The produced Hydrogen and Oxygen accumulates in separate chambers in the upper region of the Electrolyze Device 24.

There are several different Electrolyze designs are known and this invention is not limited by the choice of a certain design.

In order to prevent corrosion of the electrodes by the Chlorine and other chemicals produced by the electrolysis the electrodes must be made of materials adequately resistant for aggressive mediums. For example the anode where the Chlorine is produced can be made of carbon or Titanium with Platinum plating. In accordance with this invention use of carbon fiber for example in wowed or matte form and with epoxy or other plastic backing is advantageous as electrode material. The carbon provides the electrical conductivity and the epoxy stands for the mechanical strength.

The electrolyze device 24 as a whole assumed to be electrically insulated from the housing 3. Therefore, supports 45 made of electrically insulating materials are recommended.

The water entrance 25 from the surrounding free flow area into the electrolyze device 24 shall be equipped with electrically insulated entrance tubes 26 and strainers 27 preventing impurities to enter the electrolyze device 24. The turbine unit is under the water surface 38 causing that the electrolyze device 24 is exposed for the static pressure due to the elevation difference between the water surface 38 and the electrolyze device 24. The Hydrogen, Oxygen and the Chlorine gas generated at the electrodes will be partially compressed and/or absorbed by the surrounding water. The fluid - gas mixture will have a density lower that the surrounding water causing a natural circulation upward.

The prime product of the process is the Hydrogen. Therefore, other gasses such as the Oxygen and Chlorine can be returned into the free flowing water through tubes 44 made of combination of electrically insulating and chemically resistive components. The chemical resistance against Chlorine is a main concern.

Also the Hydrogen, created at the cathodes, has a tendency to rise in the direction of the water surface 38. However, the Hydrogen which is the main product shall be collected in the upper regions of the electrolyze device and discharged into the pipe line 29. The Hydrogen shall be transported from the housing 3 to the land in pipe line 35. A possible scenario that the Hydrogen line 35 first must go down to the bottom 37 of the free flowing water prior to this it can be led above the water surface 38 to a holding tank located on the land. The end point of the line is on a higher elevation than the starting point providing a natural circulation direction. However the length of the line as well as recognition that the medium may be a gas—fluid mix, therefore, this invention proposes the use of a pump 30 for transportation and partial compression of the Hydrogen—fluid mix. The pump can be driven mechanically through a shaft coupling 31 by the turbine—generator shaft system.

Since the hydro-turbine and generating unit is submerged under the water surface 38, therefore, the flooding of the equipment inside of the housing 3 must be prevented. In accordance with this invention the housing 3 is filled with Hydrogen. Having an internal pressure slightly higher than the external pressure the eventual leakage will be oriented from the inside against the outside. The Hydrogen is frequently used for cooling of electrical generators and it will be beneficial also in this application.

The flooding prevention through elevated pressure can be achieved by a diversion 34 of the pressure produced by the pump 30 into an automatic control valve 32 which either let a minor quantity of the Hydrogen gas be discharged into the housing's 3 internal atmosphere in order to maintain the elevated pressure or by leading the pressure to the valve system 12 to push out the water, accumulated at the lowest point of the housing, into the surrounding free water current. The automatic valves 32 and 12 can be controlled also from the land through the main control cable 36 with branches 33 and 34. The control cable 36 is a multi-conductor electric cable transferring electric measuring and control information also to the converter 19, generator 11 and other parts of the system.

FIG. 1 shows an arrangement where the bulb housing 3 is rigidly connected to a rotating housing 13, which makes it possible for the bulb housing and the turbine to swing around a vertical pole 14. The moving freedom ensures that the turbine can automatically turn into the downstream direction of the water flow. The rotating housing's top plate 14 is equipped with a support structure 17 consisting of a cylindrical and flat steel components. The stationary thrust bearing pads 16 are bolted to the support structure 17. The pads may be self lubricated or adapted to operation underwater. The upper surface of the thrust bearing collar 18, installed on the pole 14, serves as the sliding surface for the thrust bearing pads. An additional radial bearing system, not shown in the figure, may be arranged between the pole 14 and the rotating housing 13 at a lower elevation. The method of anchorage of the pole 14 to the bottom 37 depends on the local ground conditions and not influenced by this invention.

An important feature of the invention is the independence from the turbine runner's rotational speed and direction. All speed levels and directions can be converted to a useful DC power. Consequently, the freedom of rotation around a vertical axis to adapt to the free flowing water's velocity and direction not an absolute requirement. If the main direction of the free flow is determined the housing 3 can be permanently locked relative to the support structure. For example, the rotating housing 13 doesn't need to have a rotational freedom relative to the pole 14. If the blades 2 of the turbine runner are hydrodynamically symmetrical, the energy conversion from the free flow's kinetic energy into rotational mechanical power can energy can be done even at full reversion of the free flow. This design has an importance at utilization of the tidal currents.

What is claimed is:

1. Hydro-turbine driven electrical generating unit, contained in a water tight housing and submerged in a water current, consists of a combination of turbine runner, turbine shaft, turbine shaft seal, bearings, speed-increasing transmission, generator, shaft couplings, measuring and control cables and tubes, where an electric converter transforms the variable voltage and frequency produced by the generator into direct current which direct current through electrolyse separates the water into Hydrogen and Oxygen.

2. Hydro-turbine driven electrical generating unit in accordance with claim 1, where the electric converter transforming the variable voltage and frequency into direct current is placed inside of the housing.

3. Hydro-turbine driven electrical generating unit in accordance with claim 2, where the electrolyze device is a part of the hydro turbine unit.

4. Hydro-turbine driven electrical generating unit in accordance with claim 3, where the housing is filled with the Hydrogen produced by the electrolyze device.

5. Hydro-turbine driven electrical generating unit in accordance with claim 3, where the produced Hydrogen is transported by tube to a container above the water surface.

6. Hydro-turbine driven electrical generating unit in accordance with any of the previous claims, where the produced Oxygen is discharged into the free water flow outside of the housing.

7. Hydro-turbine driven electrical generating unit in accordance with any of the previous claims, where the pressure of the Hydrogen produced by the electrolyze device is increased by a pump.

8. Hydro-turbine driven electric generating unit in accordance with any of the previous claims, where the Hydrogen pressure inside the housing is maintained close to the external pressure by an automatic control valve.

9. Hydro-turbine driven electric generating unit in accordance with any of the previous claims, where the internal hydrogen pressure is used to force out the leakage water accumulated inside of the housing.

* * * * *